United States Patent
McGrath et al.

(10) Patent No.: US 6,970,639 B1
(45) Date of Patent: Nov. 29, 2005

(54) SYSTEM AND METHOD FOR EDITING SOURCE CONTENT TO PRODUCE AN EDITED CONTENT SEQUENCE

(75) Inventors: John Mark McGrath, Bracknell (GB); Andrew Collins, Basingstoke (GB); Rex Martin Dorricott, Basingstoke (GB)

(73) Assignee: Sony United Kingdom Limited, Weybridge (GB)

( * ) Notice: Subject to any disclaimer, the term of this patent is extended or adjusted under 35 U.S.C. 154(b) by 1107 days.

(21) Appl. No.: 09/656,968

(22) Filed: Sep. 7, 2000

(30) Foreign Application Priority Data

Sep. 8, 1999 (GB) .................................... 9921234

(51) Int. Cl.$^7$ .............................................. H04N 5/93
(52) U.S. Cl. ........................... 386/52; 386/55; 345/723
(58) Field of Search .............................. 386/52, 55, 95, 386/1, 54, 53; 345/723; H04N 5/93

(56) References Cited

U.S. PATENT DOCUMENTS 6,032,156 A * 2/2000 Marcus ........................ 345/723
6,236,395 B1 * 5/2001 Sezan et al. ................. 345/723

FOREIGN PATENT DOCUMENTS

| GB | 2 260 007 | 3/1993 |
|----|-----------|--------|
| GB | 2 294 355 | 4/1996 |
| GB | 2 336 025 | 10/1999 |
| WO | WO 98 44717 | 10/1998 |
| WO | WO 00 39997 | 7/2000 |

* cited by examiner

Primary Examiner—Vincent Boccio
(74) Attorney, Agent, or Firm—Frommer Lawrence & Haug LLP; William S. Frommer; Samuel S. Lee (57) ABSTRACT

The present invention provides an editing system and method for editing source content such as video and/or audio material to produce an edited content sequence, source metadata being associated with portions of the source content. The system comprises storage for storing a template defining a desired style for content, template metadata being provided within the template to define the desired style, and a processing unit configured to apply the template to the source content by comparing the source metadata with the template metadata and to arrange the portions of source content in accordance with the comparison to produce the edited content sequence. This provides an efficient technique for providing an editor with a first cut in which the content has been arranged into a desired style, thereby avoiding the need for the user to spend time familiarizing himself/herself with the content prior to performing editing of the source content. From this first cut, the user can then proceed to make any further alterations deemed appropriate.

12 Claims, 6 Drawing Sheets

SYSTEM AND METHOD FOR EDITING SOURCE CONTENT TO PRODUCE AN EDITED CONTENT SEQUENCE

BACKGROUND OF THE INVENTION

1. Field of the Invention

The present invention relates to a system and method for editing source content to produce an edited content sequence. The source content preferably takes the form of video and/or audio material which requires some editing to put it into a desired format for subsequent use.

2. Description of the Prior Art

The editing of source content is traditionally a labour intensive task performed by a skilled editor in an editing suite. An editing system is typically used to manipulate the source content under the control of the editor, current editing systems providing sophisticated tools to enable the editor to perform complex editing effects on the source content.

However, prior to performing such editing, the editor typically has to spend a significant amount of time reviewing the source content to familiarise himself/herself with the material to be edited, and the time spent performing this initial familiarisation with source content clearly impacts on the efficiency of the editing process.

SUMMARY OF THE INVENTION

Viewed from a first aspect, the present invention provides an editing system for editing source content to produce an edited content sequence, source metadata being associated with portions of the source content, the system comprising: storage for storing a template defining a desired style for content, template metadata being provided within the template to define the desired style; a processing unit configured to apply the template to the source content by comparing the source metadata with the template metadata and to arrange the portions of source content in accordance with the comparison to produce the edited content sequence.

There is currently much interest in the generation of metadata, metadata being data which describes content. The association of metadata with content is considered to be useful during archiving, where metadata can be used to assist in the process of subsequent searching and retrieval of desired content. Many standards are being developed for metadata, for example by SMPTE-EBU (Society of Motion Picture and Television Engineers—European Broadcast Union) and by MPEG-7 (Motion Pictures Expert Group, which is an ISO/IEC standards body SG29\WG11).

A certain amount of metadata can be added automatically at source, for example good shot markers, Rec marks (indicating where recording starts/stops). GPS location. Time and Date, UMID (Unique Material Identifier), Camera settings, focus, zoom, etc. Further, metadata can be manually associated with the source content after it has been created, for example Cameraman, Journalist Notes, Style comments, Suggestions. Annotations, Location/Assignment comments, Shot identification such as Intro, Finish, Commentary, Voice Over, etc. In addition, there is much development in progress directed to the automatic extraction of metadata from the content, for example by using recognition tools, for example face and feature detection tools, speech recognition tools, etc., to identify features within the content, and thereby enable appropriate metadata to be added.

The present invention takes advantage of the current proliferation in metadata associated with source content (hereafter referred to as source metadata) to improve the efficiency of the editing process. More particularly, in accordance with the present invention, a template is provided which defines a desired style for content, template metadata being provided within the template to define the desired style. The template metadata essentially provides selection or match criteria for the source metadata. The template is stored in a storage, for example on a hard disk, diskette, CDROM, etc., and the editing system is then arranged to retrieve the template and apply it to the source content by comparing the source metadata with the template metadata. The portions of source content are then arranged in accordance with the comparison to produce the edited content sequence.

In accordance with the invention, it has been realised that many types of edited material, for example news reports, sports clips/summaries, video montages, documentaries, follow a fairly similar pattern. For example, a report about a discussion in Parliament may start with an introduction, proceed to a shot of the outside of the Parliament buildings, then cut to discussions between politicians, then cut again to another picture of Parliament, and then finally proceed back to the reporter for some final comments. The editing effects applied to, or between, shots may also follow a similar pattern. The present invention makes use of this fact, and the increasing availability of metadata, to provide an editing system where templates can be created for different desired styles with template metadata being provided within these templates to define the desired style. The desired style may specify features such as the general sequence of shots, criteria to be used to select portions from the source content, editing effects to be applied, etc.

A chosen template can then be applied to the source content by comparison of the source metadata with the template metadata in order to produce an edited content sequence. This edited content sequence will provide the editor with a "first cut" in which the source content has been arranged into a desired style, thereby avoiding the need for the user to spend time familiarising himself/herself with the content prior to performing editing of the source content. From this first cut, the user can then proceed to make any further alterations deemed appropriate.

The arranging of the source content to form the edited content sequence may involve one or more steps. For example, the arranging may involve one or more of reordering portions of the source content, selecting portions from the source content, applying editing effects to the source content, inserting captions, etc. In preferred embodiments, the arranging of the portions of source content to produce the edited content sequence comprises at least the selection and ordering of a subset of the portions of the source content based on the comparison of the source metadata with the template metadata. Hence, for example, in preferred embodiments the source content may include multiple "takes" of the same shot, and the source metadata may provide an indication of which take is preferred, e.g. by use of a good shot marker associated with that take. Assuming such a good shot marker is identified by the template metadata, then the comparison of the template metadata and source metadata can be used to select for a particular shot only the preferred take for use in producing the edited content sequence. It will be appreciated that this approach may result in an edited content sequence being produced which is significantly shorter than the original source content.

The template may take a variety of forms, but in preferred embodiments the template defines a plurality of discrete sections which are linked to define the desired style, each discrete section having template metadata associated therewith.

Each discrete section can be thought of in preferred embodiments as defining a type of content desired for the corresponding part of the desired sequence and one or more items of template metadata can be associated with each discrete section to define the type of content to be associated with that discrete section.

In preferred embodiments, the source content comprises video material, and a number of the discrete sections identify types of video material, the template metadata associated with such a discrete section comprising at least metadata identifying the corresponding type of video material. For example, one discrete section might be provided for "still" shots, and the metadata associated with that discrete section would then preferably be of the type which would identify still shots in the source content. By this approach, when the template metadata for that discrete section is compared with the source metadata, still shots within the source content will be identified, and one or more of the portions of source content representing those still shots can be associated with that discrete section for use in producing the edited content sequence.

Preferably, in addition to, or as an alternative to, video material, the content may comprise audio material, and the template metadata associated with a number of the discrete sections includes metadata relevant to the audio material. Such metadata may for example indicate high background noise, low background noise, rhythm, period sound events, etc., and this can be used when comparing the template metadata with the source metadata to identify parts of the source content containing audio of desired types.

As mentioned previously, metadata may be added to the source content at source, or may be added, for example manually, at some stage after the source content is recorded. In addition, in preferred embodiments, the system may further comprise: a metadata processing element for accessing one or more predetermined recognition tools and causing the source content to be reviewed by the one or more predetermined recognition tools in order to generate source metadata to be associated with the source content, the source metadata thus generated being used by the processing unit when applying the template to the source content by comparing the source metadata with the template metadata. The metadata processing element may be embodied in hardware, firmware and/or software, as appropriate, to control the access to the one or more predetermined recognition tools, and the generation of metadata using those tools. Hence, for example, a recognition tool for identifying faces may be used to scan the source content looking for video containing faces. Once these faces have been identified, automatic or manual recognition of the faces may be used to identify the people concerned, and to add appropriate metadata responsive to the recognition.

In preferred embodiments, the metadata processing element is responsive to user input to enable user interaction during the generation of the source metadata. Accordingly, with reference to the above example, any faces found may be presented to the user, and the user prompted to provide metadata concerning those images, for example an identification of the person shown in the image.

Viewed from a second aspect, the present invention provides a template defining a desired style for content, template metadata being provided within the template to define the desired style. In preferred embodiments, the template comprises a plurality of discrete sections which are linked to define the desired style, each discrete section having template metadata associated therewith. Hence, in accordance with this aspect of the invention, a number of templates can be prepared to define particular formats required for edited content sequences, and these templates can then be selected as appropriate for use by the editing system in accordance with the first aspect of the present invention.

Viewed from a third aspect, the present invention provides a method of operating an editing system to edit source content to produce an edited content sequence, comprising the steps of: (a) receiving the source content to be edited, source metadata being associated with portions of the source content; (b) providing a template defining a desired style for content, template metadata being provided within the template to define the desired style; (c) applying the template to the source content by comparing the source metadata with the template metadata; and (d) arranging the portions of source content in accordance with the comparison at the step (c) to produce the edited content sequence.

Viewed from a fourth aspect the present invention provides a computer program for operating an editing system to edit source content to produce an edited content sequence, source metadata being associated with portions of the source content, the computer program being configured in operation to cause the editing system to perform the steps of: (a) retrieving from a storage a template defining a desired style for content, template metadata being provided within the template to define the desired style; (b) applying the template to the source content by comparing the source metadata with the template metadata; and (c) arranging the portions of source content in accordance with the comparison at the step (b) to produce the edited content sequence.

BRIEF DESCRIPTION OF THE DRAWINGS

The present invention will be described further, by way of example only, with reference to a preferred embodiment thereof as illustrated in the accompanying drawings, in which.

DESCRIPTION OF A PREFERRED EMBODIMENT

Figure 1:
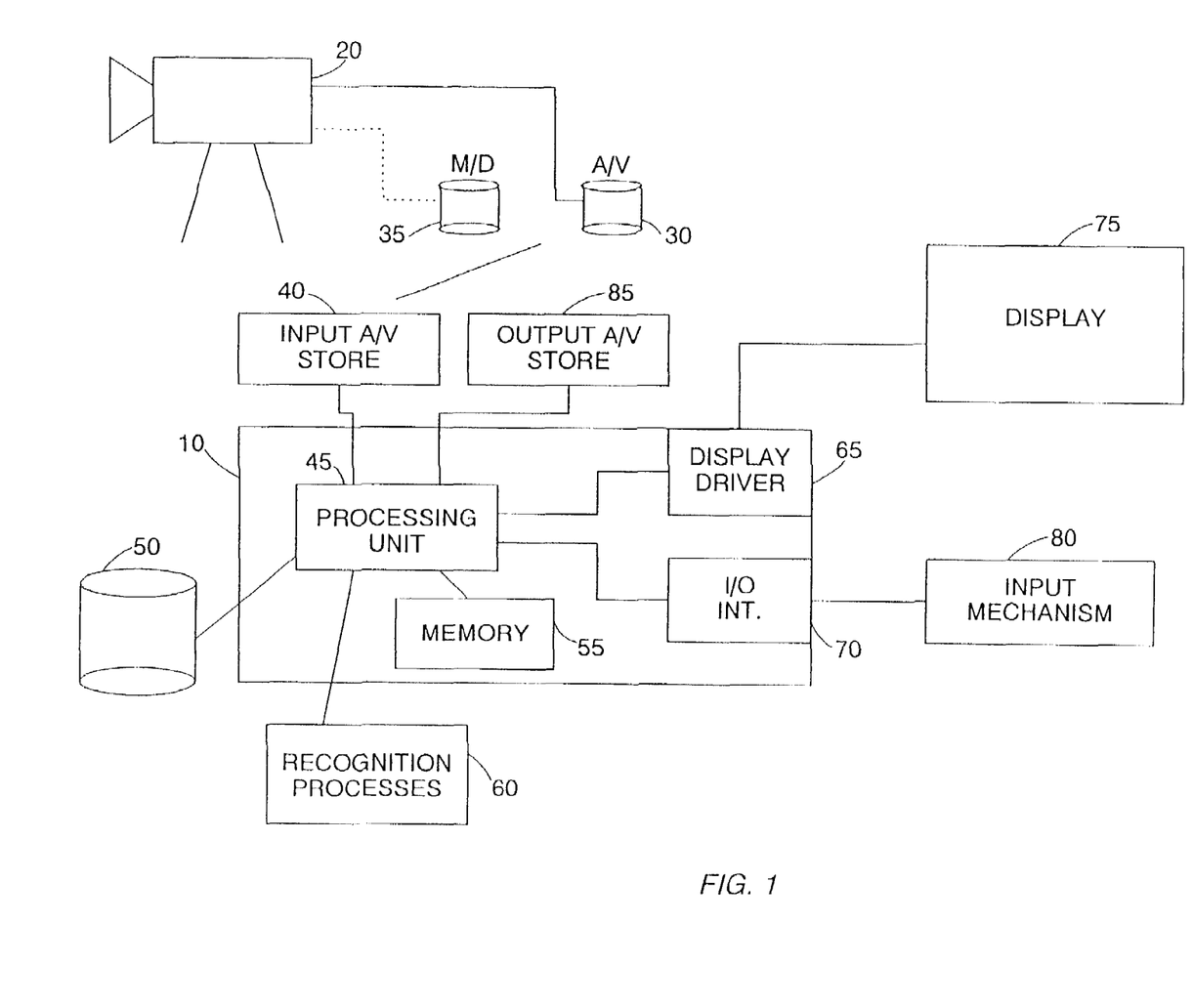
FIG. 1 is a block diagram illustrating an editing system in accordance with a preferred embodiment of the present invention.

FIG. 1 is a block diagram illustrating an editing system 10 in accordance with a preferred embodiment of the present invention. The editing system 10 includes a processing unit 45, for example a microprocessor, for receiving source content and applying editing operations to the source content in order to produce an edited content sequence. Internal memory 55, for example read only memory (ROM), random access memory (RAM), etc., is provided to store software executed by the processing unit 45, along with data used by the processing unit 45.

A display driver 65 is provided to enable display signals to be output from the editing system 10 to a connected display device 75. Further, an input/output interface 70 is provided to enable an input mechanism 80, for example a keyboard, mouse, jog-shuttle dial, pen and tablet, etc., to be connected to the editing system 10. Via the display device 75 and the input mechanism 80, a user of the editing system 10 is able to interact with the editing process performed by the editing system 10.

For the purpose of the preferred embodiment of the present invention, it will be assumed that the source content edited by the editing system 10 is audio/video (A/V) material, such as may be obtained via a digital camera 20. Although A/V material may also be produced in analogue form, in preferred embodiments of the present invention the editing system operates on digital data, and hence any analogue A/V material would be converted into digital form prior to inputting to the editing system 10.

When A/V material is produced by the digital camera 20, it is stored on a suitable medium 30, for example a digital tape, or a digital disk. Digital technology is now at a stage where certain metadata can be associated with the A/V material at the time that A/V material is first generated, and in preferred embodiments such metadata will be stored on a suitable medium 35, which again may be a digital tape or disk. It should be noted that in preferred embodiments the metadata is located on the same physical storage medium as the A/V material to which it relates, but could alternatively be stored on a separate storage medium.

At some point prior to the A/V material being passed to the editing system 10, additional metadata may be added if desired, for example via the manual addition of metadata. When the A/V material is to be edited, it is stored in an input A/V store 40, for example a digital tape or disk player, or a server, along with any associated metadata (hereafter referred to as source metadata).

In accordance with the preferred embodiment of the present invention, one or more templates are provided in a storage 50, which may for example be a database or other storage accessible via a network. However, although the storage 50 is illustrated as a separate entity in FIG. 1, the templates might alternatively be stored locally, for example within the memory 55. It has been realised that many types of edited material, for example news reports, follow a fairly similar pattern. Accordingly, in accordance with preferred embodiments of the present invention, each template defines a desired style for A/V material, template metadata being provided within each template to define the desired style.

The editing system 10 is arranged to retrieve a suitable template from the template storage 50, and apply that template to the source A/V material from the input A/V store 40 by comparing the template metadata with the source metadata associated with the source A/V material. This job is performed by the processing unit 45, and results in the source A/V material being arranged to produce an edited content sequence dependent on the comparison of the source metadata with the template metadata. This edited content sequence may be output from the processing unit 45 to an output A/V store 85, or may be subject to further alterations by a user of the editing system 10. As with the input A/V store 40, the output A/V store 85 may be a digital tape or disk player, a server, etc.

In preferred embodiments of the present invention, it is envisaged that the template will be chosen by a user of the editing system based on the user's understanding of the A/V material to be edited. For example, the user may be provided with explicit instructions concerning the choice of template from the person requesting that the A/V material be edited. Hence, as an example, the user of the editing system 10 may receive some A/V material relating to a news item, along with instructions to use a particular news template within the template storage 50. Alternatively, the user may determine for himself/herself which template to use, based on the type of A/V material to be edited. Although the choice of template from the storage 50 might typically be made manually, it will also be appreciated that metadata associated with the A/V material to be edited might directly specify to the processing unit 45 which template to use, such that an automatic selection of the template could be made by the editing system 10.

In accordance with the preferred embodiment of the present invention, the editing system 10 is able to be connected to a number of recognition processes 60, which might take the form of one or more plug-in recognition tools. These recognition tools can then be used to assist in the generation of further metadata by the editing system 10. For example, a recognition tool for detecting faces might be used to scan the source A/V material looking for video containing faces. Once these faces have been identified, they may be presented to the user of the editing system, prompting the user to input metadata relating to the identification of the faces detected. Alternatively, some automatic recognition of faces may be possible if either the recognition tool, or the editing system 10, has access to a suitable database of people's faces. Similarly, a recognition tool may be provided which recognises speech, and thereby enables metadata relating to audio material within the A/V source to be added.

Figure 2:
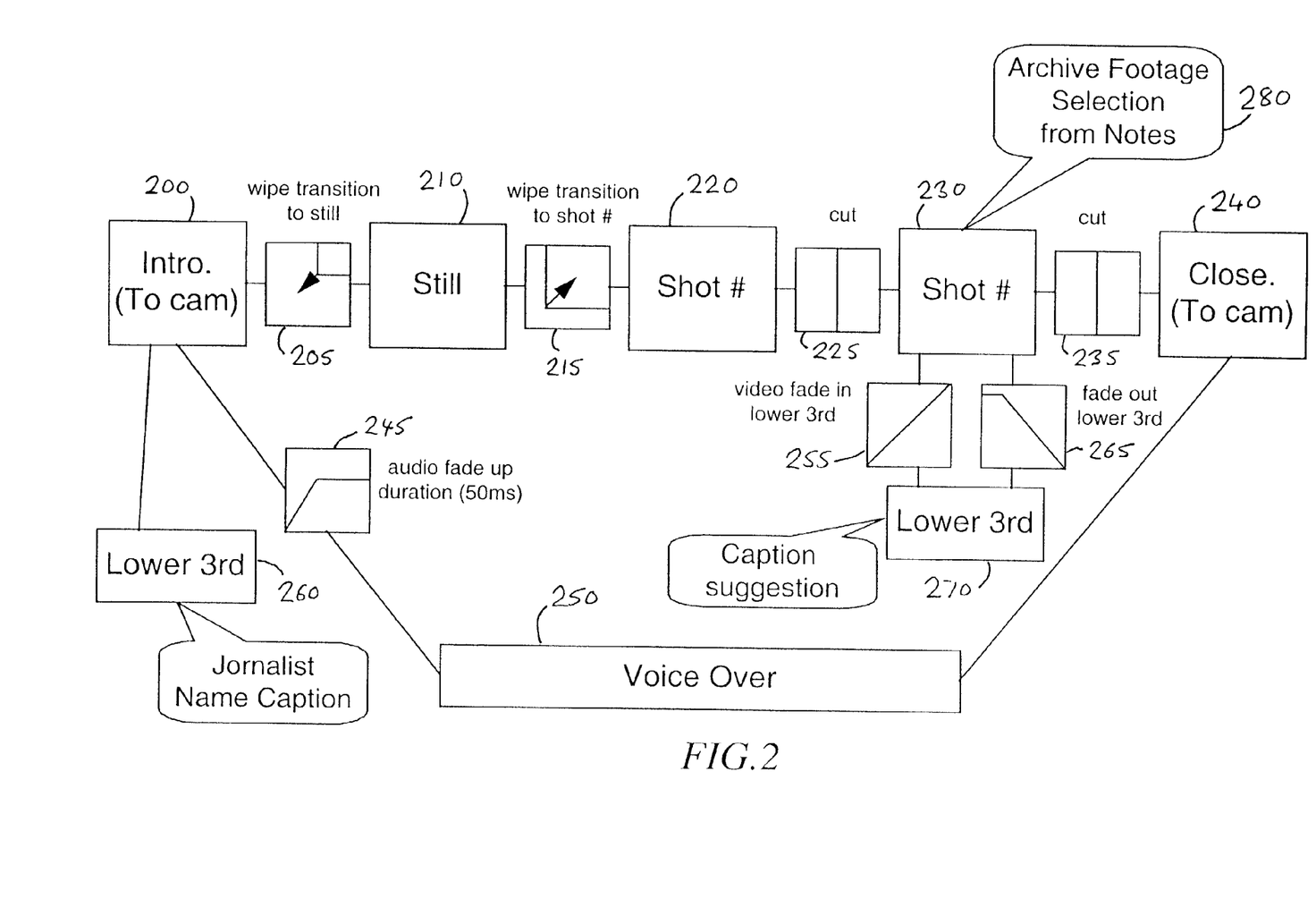
FIG. 2 provides a schematic illustration of a template constructed in accordance with preferred embodiments of the present invention.

Having discussed the editing system of preferred embodiments, the templates used by the editing system will now be discussed in more detail with reference to FIG. 2. FIG. 2 provides a schematic illustration of an exemplary template which may be provided within the template storage 50. The template describes an A/V sequence consisting of five main sections 200, 210, 220, 230 and 240. The first section will consist of material providing an introduction to camera, the second section 210 will consist of one or more still pictures, the third section 220 will provide video footage of a particular shot, the fourth section 230 will provide video footage of a further shot, and the final section 240 will provide a closing sequence, again directed to the camera. A further section 250 is provided for audio voice over material, which will be used to provide the audio associated with sections 210, 220 and 230.

A number of particular editing effects (such as video wipes, page turns, audio fades, cross fades, etc), keying and/or technical adjustments may be associated with each section, and during the generation of the edited content sequence the user may be prompted as to whether he/she wishes to use those associated effects, keying or adjustments. For example, section 200 may have associated therewith an editing effect indicating that a box wipe from top right to bottom left should be applied at the end of the introduction (as indicated by block 205), whilst section 210 may have associated therewith an editing effect indicating that a box wipe from bottom left to top right should be applied at the end of the still picture(s) (as indicated by block 215). Similarly, straight cuts may be specified between sections 220 and 230, and between sections 230 and 240, as indicated by blocks 225 and 235. Further, an audio fade up may be specified for the beginning of section 250, as indicated by block 245, and video fades in and out may be associated with a caption for section 230, as indicated by blocks 255 and 265. Captions may be suggested to the user, as indicated for example by the blocks 260 and 270 associated with sections 200 and 230, respectively.

Each section may have one or more items of metadata associated with it, such metadata being referred to hereafter as template metadata. The template metadata associated with a particular section is used to define the type of content to be associated with that section. There are many types of metadata which may be associated with each section of the template, Table 1 below providing some examples of types of metadata:

TABLE 1

Business information: Cameraman, Journalist, Assignment number, Copyright.
Equipment specification: Camera Serial Number, Lens Parameters, Technical Features.
Material identification: Unique Material Identifiers (UMID)
Location markers: GPS, Timezone, Fixed location (e.g. Speaker's microphone in UK Parliament, or Goal end camera)
User defined marking: Good shot markers, production comments.
External motion: Global camera motion through zoom or panning.
Internal motion: Object trajectory, such as in sports, or human motion (i.e. a cohesive object such as a person with a "relatively" slowly changing motion)
Transition marking: Automated identification and categorisation of cut, dissolve, fade.
Shot Composition marking: Zoom and wide angle marking.
Noise marking: High background noise (probably high power low frequency noise) or low noise (i.e. silence portions).
Tempo/Beat marking: Rhythm, period sound events.
Colour/Contrast change: Could be caused by camera flash, lighting effects.
Pitch/Volume modulation: This is the case for long term audio events such as music or speech dialogues.
Audio Pattern/Discontinuity: Such as rhythm, tempo, pace.

When a particular template is selected, the processing unit 45 of the editing system 10 is arranged to apply the template to the source A/V material in order to generate an edited content sequence. This is done by comparing the source metadata with the template metadata in order to associate individual portions of the source A/V material with particular sections of the template. For example, particular portions of the source A/V material may have source metadata associated therewith that corresponds to the template metadata associated with the section 210, and identifies that those portions of the A/V material relate to still pictures. Similarly, other portions of the A/V material may have source metadata associated therewith that corresponds to the template metadata associated with the section 220 identifying a first particular shot. Further, certain portions of the source material may have source metadata identifying that they relate to voice over material, and the correspondence of this metadata with the template metadata associated with section 250 will be used to associate that source material with the section 250 of the template.

Following the comparison of the template metadata with the source metadata, the relevant portions of the source A/V material are then preferably arranged in accordance with the comparison to produce an edited content sequence which follows the general style defined by the template. This will preferably involve selection of a subset of the portions of the source material and reordering of those portions to follow the style defined by the template. Any editing effects, etc that are specified will also be applied at this time. Accordingly, via selection of an appropriate template, the user of the editing system is automatically provided with a first cut of an edited sequence in which preferred parts of the source content have been selected and ordered, and in which certain editing effects may have been applied. Accordingly, the user is then able to review the edited content sequence, and determine if any further alterations are required.

It is possible that certain tags can also be associated with particular sections, so as to cause the editing system 10 to search through certain archive material in order to retrieve additional footage which may be appropriate for use. This searching will again preferably take place by comparing the template metadata for the particular section with which the tag is associated with metadata associated with the archive material in order to retrieve suitable footage relevant to that section. With reference to the example of FIG. 2, this process is indicated by the block 280 associated with section 230, which indicates that some source metadata in the form of annotated notes associated with the source A/V material has specified an archive footage selection.

Figure 3A:
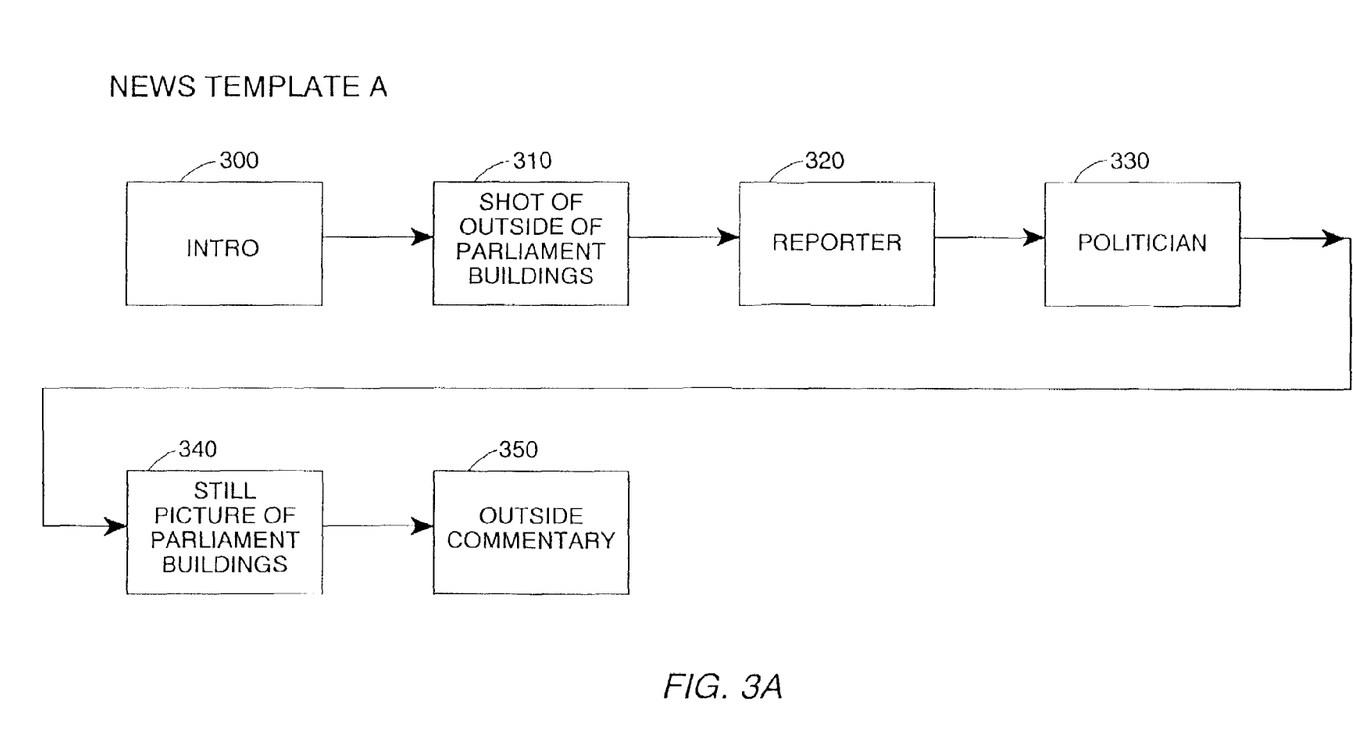
FIGS. 3A, 3B and 3C illustrate the application of a template to source content in accordance with preferred embodiments of the present invention.

The application of a template to source content will now be described by way of example with reference to FIGS. 3A to 3C. FIG. 3A provides a schematic illustration of a news template A which might be specified by the producer of a particular source A/V material relating to a news item. In accordance with news template A, the desired style is defined by six sections 300, 310, 320, 330, 340 and 350. The first section relates to an introduction concerning the news item being reported on, the second section provides some shots of the outside of the Parliament buildings the third section provides shots of the reporter, the fourth section 330 provides shots of the politician, the fifth section provides some still pictures of the Parliament buildings, and the final section 350 provides some final outside commentary concerning the topic under discussion. As with the template described with reference to FIG. 2, particular editing effects, etc. may be associated with each section, but for the sake of simplicity these have been omitted from FIG. 3A. Each section will have a number of items of template metadata associated therewith, which are used when reviewing the source content to determine which sections of the template any particular portion of the source content should be associated with.

Figure 3B:
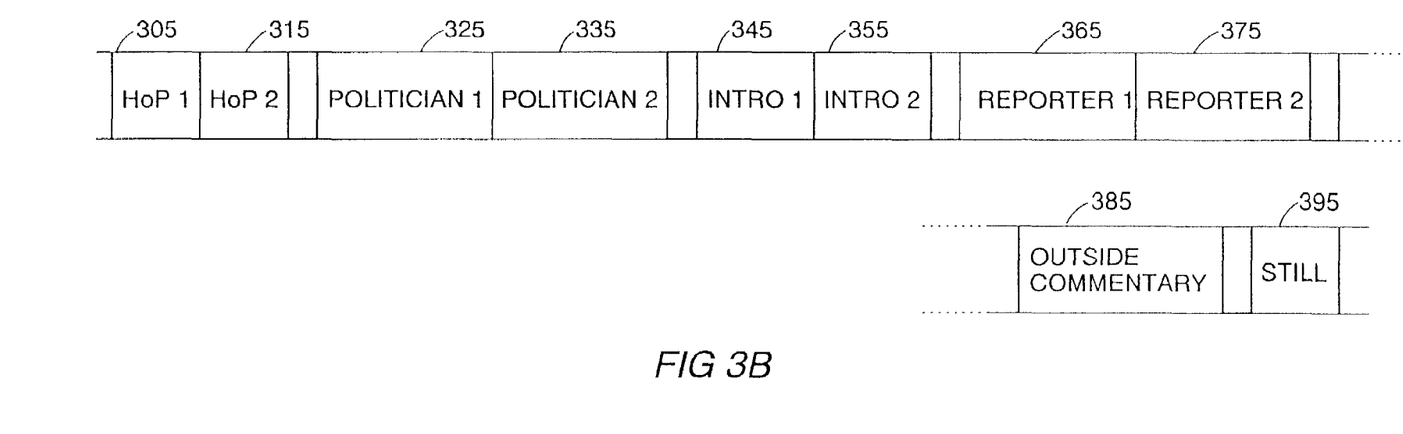
Figure 3C:
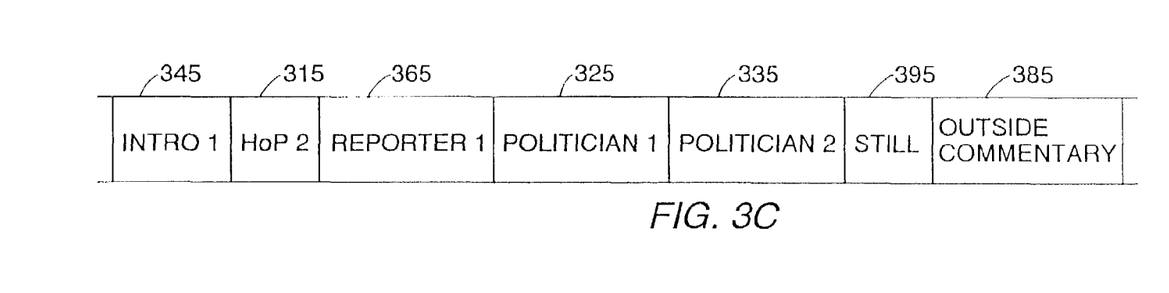

FIG. 3B illustrates the original source A/V material in the order in which it appears on the source medium. In this example, the source material is made up of ten portions 305 to 395 relating to individual shots or takes captured. Between some portions, there will typically be miscellaneous material of no interest, for example material recorded during setting up of the camera, etc., this material being represented by the shaded areas in FIG. 3B. In a typical prior art editing system, the user of the editing system (often accompanied by someone involved in the production of the source content, e.g. the journalist) would have to scan through the original source material several times to familiarise himself/herself with the entire content of the source material so as to decide which portions might be used for particular parts of the final edited content sequence. However, in accordance with the preferred embodiment of the present invention, someone involved in the production of the source content, e.g. the producer, will specify that the edited content sequence should conform to news template A, and hence news template A will be selected from the template storage 50 for use by the editing system 10.

Prior to application of the template to the source content, source metadata will be associated with the various portions of the source content, for example source metadata may be associated with the content as it is first captured, or source metadata may be added subsequently, for example via manual insertion of appropriate metadata. When the source content, along with associated source metadata, is received by the editing system 10, the editing system 10 can apply news template A to the source material by comparing the template metadata associated with each section of template A with the source metadata associated with the portions of the source material.

Thus, the intro section 300 may include template metadata of types which would generally identify an introductory portion within source material, and in reviewing the source material, it may be found that certain items of the template metadata associated with section 300 may correspond to source metadata associated with portions 345 and 355 representing two takes of the introduction. For example, portions 345 and 355 may have been identified as takes of an introduction by manual insertion of source metadata identifying those portions as introductions.

However, preferably, those portions may also include metadata identifying which of those two takes of the introduction is preferred, for example through use of a good shot marker. If the template metadata associated with section 300 also includes template metadata which would assist in identifying portions within source material marked as good, then the application of the template to the source content will result in the preferred take of the introduction being selected. Hence, in the FIG. 3 example, it is assumed that such source metadata has been added, and that Intro 1 portion 345 representing the first take is preferred. Hence, portion 345 is associated with section 300.

Similarly, the template data associated with section 310 would typically be metadata that would assist in identifying shots of the Houses of Parliament. For example, metadata identifying the GPS location of the Parliament buildings may be associated with section 310. If when reviewing the source content, that GPS location metadata is found in association with portions 305 and 315, then it will be determined that those portions should be associated with section 310 for the purposes of determining the ordering of the portions within the edited content sequence to be produced. However, again, in preferred embodiments, the source metadata identifies one of the shots as being better, in this case the shot represented by portion 315, and the template metadata includes types which would enable the good shot to be identified via that source metadata. Accordingly, only portion 315 is associated with the section 310.

Similarly, with regard to sections 320 and 330 relating to the reporter and the politician, respectively, metadata may have been added to the source content identifying those portions of the source content relating to takes of the reporter, and those portions of the content relating to takes of the politician. This may have been done directly, or alternatively certain recognition tools, such as face detection tools, may have been used to identify those portions of the source material providing face shots, and those portions may have been presented to a user for labelling with appropriate metadata to identify those portions relating to the reporter and those portions relating to the politician. Accordingly, when reviewing the source material, the editing system would identify that portions 365 and 375 would appropriately be associated with section 320, and that portions 325 and 335 would appropriately be associated with section 330. However, in this example, a good shot marker is associated with portion 365, so it is selected in preference to portion 375.

In the example, no such good shot marker is associated with portions 325 and 335 and so in preferred embodiments both portions are associated with section 330, and the user will subsequently be able to choose between the two takes. It should be noted that this would also be the case if section 330 did not include template metadata of the type which would enable identification of preferred shots or takes, e.g. if the template metadata did not include types which would assist in identifying good shot markers or the like.

Suitable metadata will also be associated with sections 340 and 350 to assist in the identification of any portions of source content relating to still pictures, or to outside commentary, respectively. Accordingly, when the news template A illustrated in FIG. 3A is applied to the source content illustrated in FIG. 3B by comparison of the template metadata with the source metadata, this will result in the source content being rearranged to form the edited content sequence identified in FIG. 3C.

This edited content sequence generated automatically by the editing system through comparison of the source content with the news template A can then be presented to the user of the editing system for further adjustment as necessary. It will be appreciated that since various segmented portions of the source content have now been rearranged into an appropriate order for the final edited material, and that in preferred embodiments certain portions of the source content have been dropped in preference of alternative takes/shots, then this avoids the need for the user to spend time familiarising himself/herself with the content prior to performing editing of the source content. From this first cut, the user can then proceed to make any further alterations deemed appropriate. It has been found that this significantly improves the efficiency of the editing process.

Figure 4A:
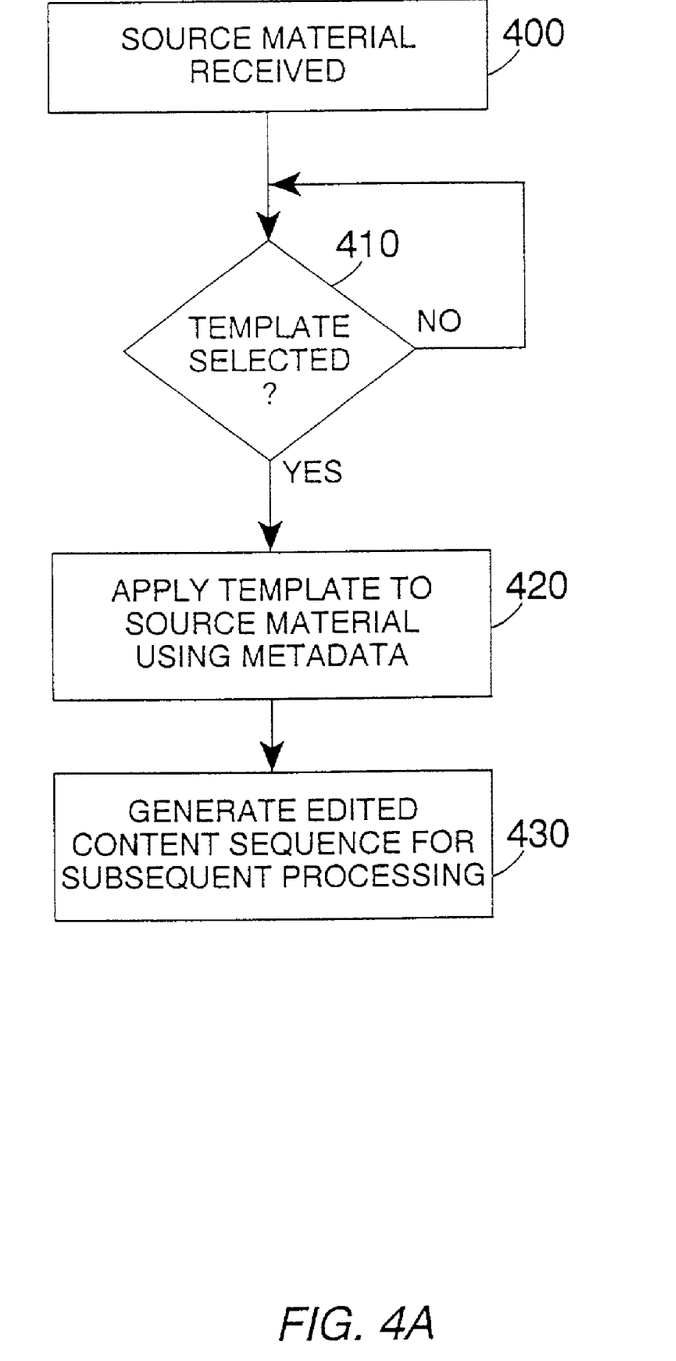
FIG. 4A is a flow diagram illustrating the operation of an editing system in accordance with a first embodiment of the present invention.

FIG. 4A is a flow diagram illustrating the process performed within the editing system 10 in accordance with a first embodiment of the present invention. At step 400, the source material is received, and hence for example is loaded into the input A/V store 40. Then at step 410, the editing system determines whether a template has been selected. In preferred embodiments, this is done manually by the user making an appropriate selection via the input mechanism 80. However, as discussed earlier, metadata identifying the template to be used, and recognisable directly by the editing system, may already be associated with the source material, and enable the editing system to automatically select the desired template.

The process then proceeds to step 420, where the template is retrieved from the template storage 50 and applied to the source material by comparing the template metadata with the source metadata. As a result of the comparison, at step 430 an edited content sequence is generated for review by a user. As mentioned earlier, this edited content sequence is produced by arranging the portions of the original source material in accordance with the comparison of the template metadata with the source metadata as performed at step 420. Preferably, this process involves the selection and ordering of certain portions of the source material to produce the edited content sequence, and may also involve the application of editing effects, etc.

Figure 4B:
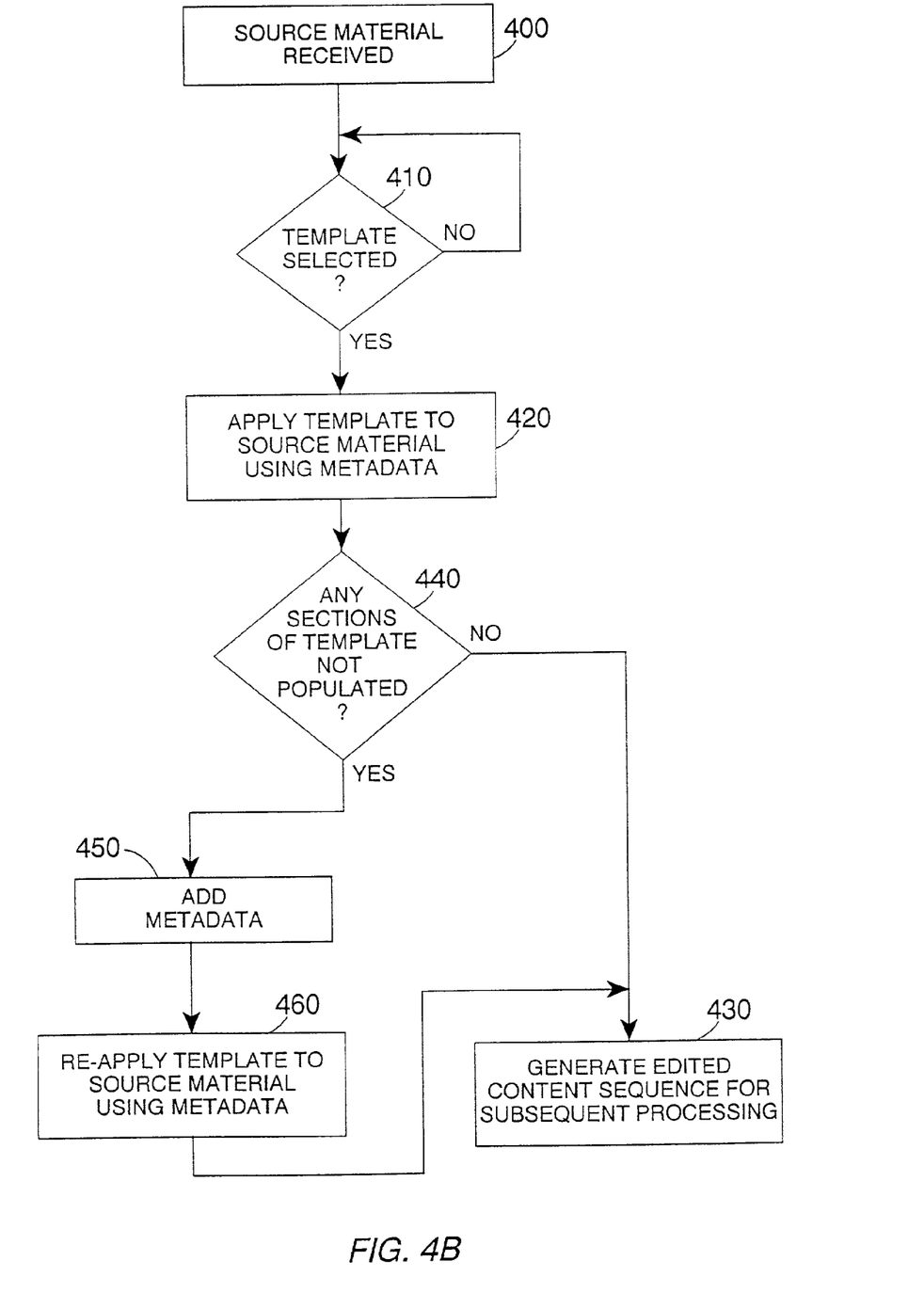
FIG. 4B is a flow diagram illustrating the operation of an editing system in accordance with a second embodiment of the present invention.

In FIG. 4A, it is assumed that the source material has appropriate metadata to enable the application of the template to the source material. FIG. 4B illustrates an alternative embodiment in which the source metadata may be supplemented during the editing process.

The first three steps 400, 410 and 420 of FIG. 4B are the same as those discussed earlier with reference to FIG. 4A. However, once the template has been applied to the source material by comparing the template metadata with the source metadata it is determined at step 440 whether any sections of the template are not populated, i.e. whether any sections have no portions of the source material associated with them. If this is the case, it may be that the source material does not contain any portions relevant to those sections of the template. However, it is also possible that there are portions of the source material which had insufficient source metadata to enable them to be associated with those sections of the template. This alternative embodiment of the present invention aims to deal with such latter cases by seeking to associate further metadata with those portions.

Hence, if at step 440 it is determined that any sections of the template are unpopulated, then the process proceeds to step 450, where the editing system seeks to add further metadata. As discussed earlier, this may occur in a number of ways. Firstly, the editing system might display to the user any portions of the source material not yet associated with a section of the template, and prompt the user to add metadata to those portions. Alternatively, or in addition, certain recognition processes 60 might be used by the editing system to identify features, such as faces, or voice, within those portions of the source material, which might facilitate the automatic or manual generation of further metadata.

Once this process has been completed, then at step 460 the template is reapplied to the source material using the supplemented metadata. By supplementing the metadata, it is possible that when reapplying the template, certain sections of the template previously unpopulated may now have portions of the source material associated with them.

The process then proceeds to step 430, where the edited content sequence is generated by arranging the portions of the source material in accordance with the comparison of the template metadata with the source metadata at step 460. It should also be noted that if at step 440, it was determined that all sections of the template were populated, then the process will proceed directly to step 430 from step 440.

Although a particular embodiment of the invention has been described herewith, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. An editing system for editing source content to produce an edited content sequence, source metadata being associated with portions of the source content, the system comprising:

a storage for storing a template defining a desired style for content, template metadata being provided within the template to define the desired style, template metadata including at least one good shot marker;

a processing unit configured to apply the template to the source content by comparing the source metadata with the template metadata and to arrange the portions of source content in accordance with the comparison to produce the edited content sequence, wherein the source metadata includes at least one good shot marker, and the processing unit is configured to compare the good shot marker in the template metadata with the good shot marker in the source metadata, to select a preferred shot.

2. A system as claimed in claim 1, wherein the arranging of the portions of source content to produce the edited content sequence comprises selection and ordering of a subset of the portions of the source content based on the comparison of the source metadata with the template metadata.

3. A system as claimed in claim 1, wherein the template defines a plurality of discrete sections which are linked to define the desired style, each discrete section having template metadata associated therewith.

4. A system as claimed in claim 3, wherein the source content comprises video material, and a number of discrete sections identify types of video material, the template metadata associated with such a discrete section comprising at least metadata identifying the corresponding type of video material.

5. A system as claimed in claim 3, wherein the content comprises audio material, and the template metadata associated with a number of the discrete sections includes metadata relevant to the audio material.

6. A system as claimed in claim 3, wherein the processing unit is operable to allow a user to select which one of a plurality of portions of the source content to use in the edited content sequence if a plurality of portions of the source content are selected by the processing unit for a discrete section of the template based upon a comparison of the template metadata associated with the discrete section of the template and the source metadata associated with each of the plurality of portions of the source content.

7. A system as claimed in claim 1, further comprising:

a metadata processing element for accessing one or more predetermined recognition tools and causing the source content to be reviewed by the one or more predetermined recognition tools in order to generate source metadata to be associated with the source content, the source metadata thus generated being used by the processing unit when applying the template to the source content by comparing the source metadata with the template metadata.

8. A system as claimed in claim 7, wherein the metadata processing element is responsive to user input to enable user interaction during the generation of the source metadata.

9. A system as claimed in claim 1, wherein the processing unit is operable to select a template for use in the production of the edited content sequence from a plurality of templates stored in the storage, the selection of the template being dependent upon the source metadata.

10. A storage means for storing a template for use in an editing system, the template defining a desired style for content, template metadata being provided within the template to define the desired style, the template metadata including at least one good shot marker, wherein the template comprises a plurality of discrete sections which are linked to define the desired style, each discrete section having template metadata associated therewith.

11. A method of operating an editing system to edit source content to produce an edited content sequence, comprising the steps of:

(a) receiving the source content to be edited, source metadata being associated with portions of the source content, the source metadata including at least one good shot marker;
(b) providing a template defining a desired style for content, template metadata being provided within the template to define the desired style, the template metadata including at least one good shot marker;
(c) applying the template to the source content by comparing the source metadata with the template metadata, the good shot marker in the template metadata being compared with the good shot marker in the source metadata to select a preferred shot; and
(d) arranging the portions of source content in accordance with the comparison at the step (c) to produce the edited content sequence.

12. A computer program for operating an editing system to edit source content to produce an edited content sequence, source metadata being associated with portions of the source content, the source metadata including at least one good shot marker the computer program being configured in operation to cause the editing system to perform the steps of:

(a) retrieving from a storage a template defining a desired style for content, template metadata being provided within the template to define the desired style, the template metadata including at least one good shot marker;
(b) applying the template to the source content by comparing the source metadata with the template metadata, the good shot marker in the template metadata being compared with the good shot marker in the source metadata to select a preferred shot; and
(c) arranging the portions of source content in accordance with the comparison at the step (b) to produce the edited content sequence.

* * * * *